Feb. 14, 1928.

R. VARLEY 1,658,911

MOTOR DRIVEN VEHICLE

Filed Dec. 18, 1923

INVENTOR.
RICHARD VARLEY

BY Stockbridge & Borst

ATTORNEYS

Feb. 14, 1928.

R. VARLEY 1,658,911

MOTOR DRIVEN VEHICLE

Filed Dec. 18, 1923

INVENTOR.
RICHARD VARLEY
BY
Stockbridge & Borst
ATTORNEYS

Feb. 14, 1928.

R. VARLEY
MOTOR DRIVEN VEHICLE
Filed Dec. 18, 1923

INVENTOR.
RICHARD VARLEY
BY
Stockbridge & Borst
ATTORNEYS

Feb. 14, 1928.

R. VARLEY 1,658,911

MOTOR DRIVEN VEHICLE

Filed Dec. 18, 1923

INVENTOR.
RICHARD VARLEY
BY
Stockbridge & Borst
ATTORNEYS

Patented Feb. 14, 1928.

1,658,911

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

MOTOR-DRIVEN VEHICLE.

Application filed December 18, 1923. Serial No. 681,427.

This invention relates to vehicles operated by internal combustion engines. In such vehicles, the ignition, lights and starting mechanisms are commonly operated by a storage battery, which is charged by a generator driven from the engine, and an engine driven pump is commonly employed to circulate a lubricant to different parts of the engine. If the engine should stop with the circuit maker and breaker of the ignition system closed, and the vehicle is left in this condition without operation of the ignition switch to "off" position, the battery would discharge through the ignition system and soon be run down. Then when the engine was subsequently started, there would not be sufficient energy to operate the ignition system or the starter. Batteries are also frequently depleted unnecessarily by reason of the operators stopping the engine and through carelessness, forgetfulness, or for other reasons leaving the vehicle with the main or full touring lights burning. It is therefore very desirable that such dangers of depletion of the battery be avoided.

In many prior constructions, the voltage automatic cut off for the circuit between the battery and generator, has been disposed between the generator and its ground connection, with the result that the battery potential would remain on the windings of the generator. Under this condition, when moisture found its way into the windings, such as by leakage or by moist air, an electrolytic action between the windings and the grounded casing or frame occurred during the idleness of the generator, which caused corrosion and deterioration of the generator windings.

The circulating lubricant gradually takes up finely divided impurities such as carbon, metal, etc., and it is necessary that this lubricant be renewed at suitable intervals if injury to the engine bearings by the impurities is to be prevented. The determination of the time of renewal of the lubricant has been heretofore more or less guess work, and often through oversight, forgetfulness, or lack of time, the renewal is not made until considerable injury to the engine has resulted.

An object of the invention is to provide an improved construction by means of which depletion of the storage battery through any of the causes above mentioned will be positively prevented, automatically and without attention by the operator; which will not in any way hinder or interfere with the normal operation of the vehicle; which will prevent injury to the generator by electrolytic action; and which will not be affected by the character of the roadway over which the vehicle may travel. A further object is to provide an improved vehicle construction with which operation of the engine without a sufficient supply of lubricant, or with a lubricant so impure as to be dangerous to the engine will be prevented; with which the engine may be removed from the control of the impurities in the lubricant when necessary; and with which the condition of the circulating lubricant at any time may be readily ascertained in a simple manner without removal. A further object is to provide an improved construction for accomplishing the above mentioned objects, which will be comparatively simple, durable, reliable, and inexpensive. Other objects and advantages will be apparent from the following description of certain embodiments of the invention, and the novel features thereof will be particularly pointed out hereinafter in claims.

In the accompanying drawing:

Fig. 1 is a schematic diagram illustrating one embodiment of the invention;

Figure 2:
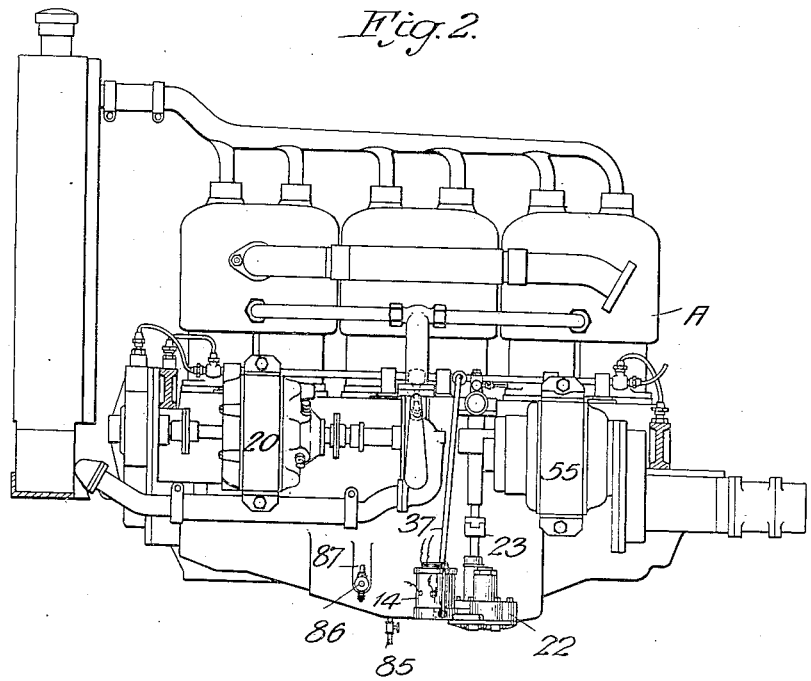
Fig. 2 is a side elevation of an internal combustion engine of a vehicle illustrating the application thereto of part of the structure comprising the invention.
Figure 5:
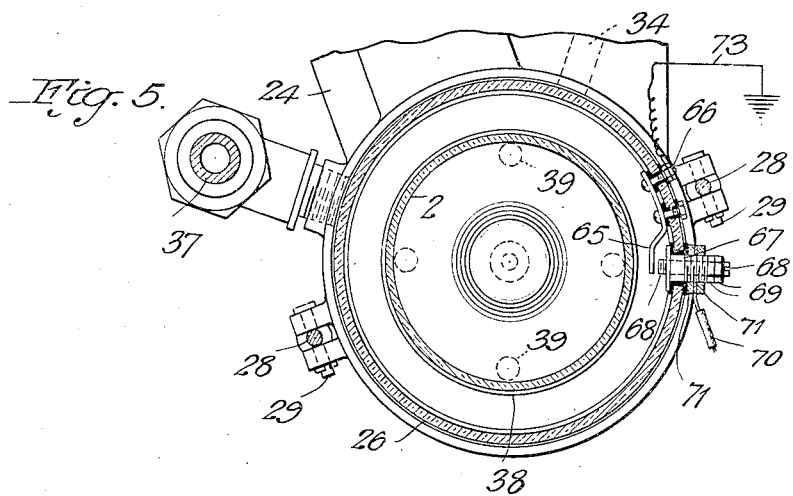
Fig. 5 is a sectional plan of the same taken substantially along the line 5—5 of Figure 3.
Figure 3:
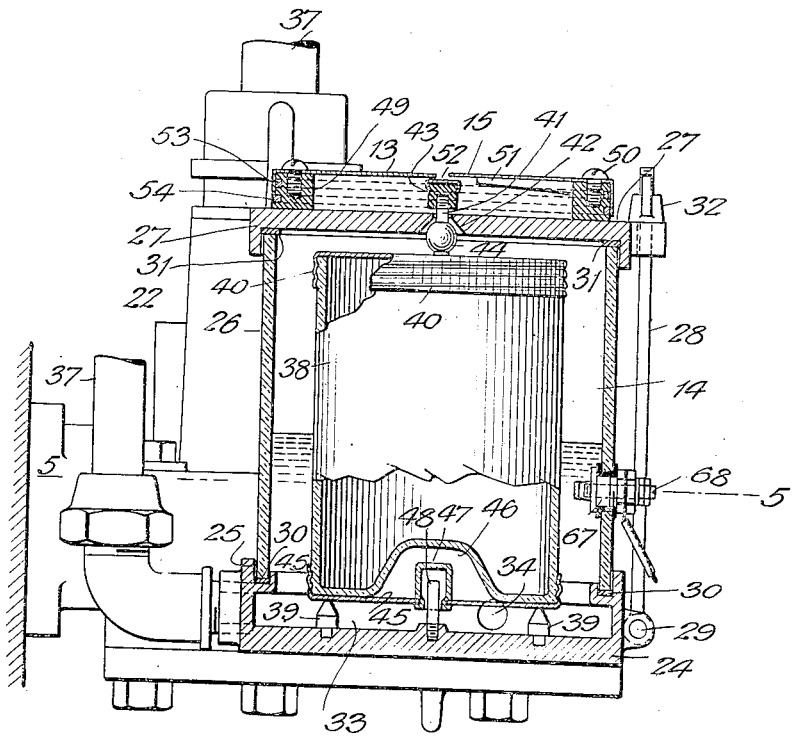
Fig. 3 is a sectional elevation through the float chamber forming a part of the invention.
Figure 4:
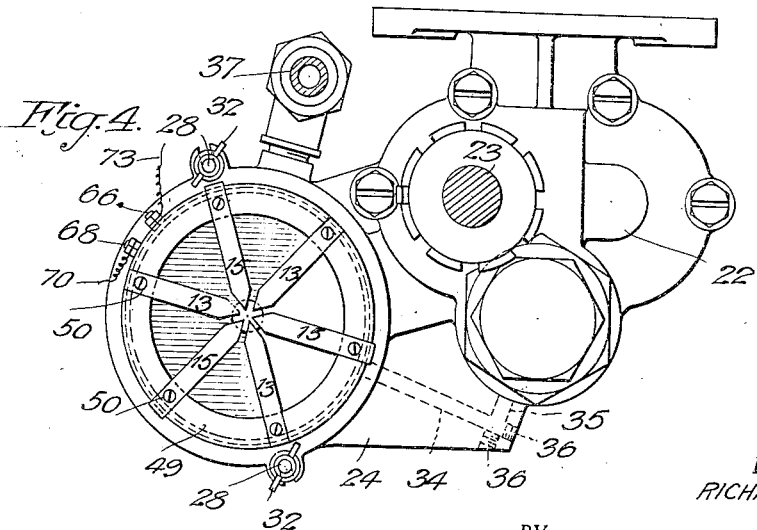
Fig. 4 is a plan of the same.

Referring particularly to the embodiment of the invention illustrated in Figures 1 to 5, the engine A of the vehicle to which the invention is applied is provided with ignition spark plugs 1 (Fig. 1) supplied with a high tension current by wires 2 leading from a distributor 3. The distributor is supplied with high tension current through a conductor 4 leading from one side of the secondary of a coil 5. The primary of the coil 5 is connected by a conductor 6 to one side of the breaker mechanism 7, and thence by a conductor 8 to ground. A condenser 9 may be connected across the contacts of the breaker mechanism, as usual in motor operated vehicles. The other side of the primary of the coil 5 is connected by a conductor 10 to the usual manually operated key-controlled ignition switch 11 and then by a conductor 12 to a contact or finger 13 provided upon the upper end of a float chamber 14. A second contact or finger 15 is also provided upon the float chamber so as to be electrically connected with the contact 13 when the engine is operating, as will be explained hereinafter in detail.

The contact 15 is connected by a conductor 16 to one terminal of a storage battery 17, the other terminal of the battery being grounded by a conductor 18. The conductor 12 running from the switch 11 is also connected by a conductor 19 to a generator 20 which is driven from the engine in any suitable manner. When the engine is operating and the contacts 13 and 15 are electrically connected, the generator will be connected through conductors 19, 12, contacts 13 and 15, and conductor 16 to the battery 17. One terminal of the generator 20 is grounded by a conductor 21, as usual in such systems in motor vehicles.

Referring to Figures 2 to 5, the details of the structure, by which the contacts 13 and 15 are connected and disconnected will now be explained. The pump 22 of the pressure lubricating system is arranged to be driven from the engine in any suitable manner, such as through a shaft 23. One side of the pump is connected to the crank casing for removing the lubricant therefrom, and the other or discharge side of the pump is connected to the various bearings and engine parts to be lubricated, so that whenever the engine is operating the lubricant will be withdrawn from the crank casing and forced under pressure to the various bearings and parts to be lubricated. The main casting of the pump may have a lateral extension 24 cast integrally therewith and serving as the base of the float chamber at one side of and in proximity to the pump. The lateral extension 24 is cup-shaped and provided upon its upper or open edge with a groove 25 in which rests a tubular shell or sleeve 26, preferably of transparent material such as glass. A cap 27 (Fig. 3) is fitted over the upper end of the shell 16 so as to close the upper end of the same. Suitable adjustable straps or rods 28 are hinged at one end by pivots 29 to the lateral extension 24, pass through the cap, and have clamping nuts 32 threaded upon their upper ends for clamping the cap 27 upon the upper end of the shell 26 and the latter within the groove 25.

A suitable gasket 30 is provided between the lower end of the shell 26 and the walls of the groove 25, and a gasket 31 is provided between the cap 27 and the upper end of the shell 26 so as to seal the abutting surfaces between them and render air-tight the chamber formed by the lateral extension 24, the shell 26, and the cap 27, this enclosure forming the float chamber 14. The rods 28, preferably pass through slots extending inwardly from the periphery of the cap 27 so that when the nuts 32 upon the upper ends of the rods are loosened, the rods 28 may be swung about their pivots to release the cap and permit access to be had to the interior of the shell 26. By tightening the nuts 32 the desired clamping action upon the cap 27 may be secured.

The lateral extension 24 is provided in its upper face with a depression or recess 33 which connects by passages 34 and 35 with the outlet or delivery side of the pump 22. The passages 34 and 35 may be conveniently provided by drilling the same at angles to one another into the combined pump and extension casting to form the outlet or delivery passage 35 (Fig. 4) and into the recess 33 to form the connecting passage 34. The outer ends of the passages beyond their intersection may then be closed by suitable plugs 36.

A conduit 37 opening from the recess 33 at a point spaced from the passage 34 leading from the pump, serves to conduct the lubricant from the float chamber to the various parts of the engine to be lubricated and replaces the conduit normally used heretofore for connection to the delivery side of the circulating pump. It will therefore be understood that when the pump is operating the lubricant will be circulated continuously through the float chamber 14.

A float 38 is provided within the float chamber and normally rests when at its lower limit of movement upon the points of suitable supporting pegs 39 (Fig. 3) that may be provided upon the upper face of the bottom of the recess 33. The float is preferably constructed from a cup-shaped shell of transparent material such as glass having its upper end closed in any suitable manner by a cap 40. The cap 40 is provided with a stem 41 passing upwardly through an aperture 42 in the cap 27, and terminating at its upper end in an insulating button 43. The aperture 42 is frusto-conical in shape, with its major base lowermost, and the portion of the stem 41 below the cap 27 is provided with an enlargement or ball 44 which is adapted to enter the converging aperture 42 and close the same against the further discharge of air when the float has moved upwardly sufficiently to electrically connect contacts 13 and 15.

A plate 45 (Fig. 3) may be provided upon the lower end of the float to rest upon the supporting points 39. The lower end of the cup-shaped shell forming the body of the float is preferably reentrant to provide an external recess 46. A guide 47 may be provided in the plate 45 so as to extend into the recess 46 and is adapted to fit over the upper end of a guide pin 48 extending upwardly from the bottom wall of the recess 33. The pin 48 and the stem 41, therefore, serve to guide the float vertically when the level of the lubricant within the chamber 14 rises and falls. The opening in the guide 47 is made somewhat larger than the pin 48 so that there will be little danger of the lubricant gumming around the pin 48 and thereby restricting or preventing the free vertical movements of the float.

A ring 49 of suitable insulating material may be provided upon the upper face of the cap 27 and serves to mount the contacts or fingers 13 and 15 which extend radially and inwardly over the button 43. A number of the spring contacts or fingers 13 and 15 are arranged around the ring 49 alternately with respect to one another and do not overlap or contact directly with one another. All of the contacts or fingers 13 and 15 may be secured to the ring 49 in any suitable manner, such as by screws 50 passing through the contacts or fingers and into the ring. The contacts 13 continually press upon the upper end of the button 43 and yieldingly stress the float downwardly throughout all of its vertical travel. These contacts or fingers, therefore, serve to yieldingly urge the float downwardly when the level of the lubricant within the chamber 14 falls.

The contacts 15 are limited in their downward movement by suitable abutments 51 carried by the ring 49, so that when the float is in its lowermost position, the contacts 15 will not be in contact with the button 43, but will be engaged therewith before the float reaches its uppermost limit of movement. The upper end face of the button 43 is provided with a non-oxidizable metallic cap 52 which may be secured thereon in any suitable manner, such as by spinning its edges into a peripheral groove of the button. The contacts or fingers 13 and 15 will thus be electrically connected when the float moves upwardly and will be disconnected when the float descends.

The contacts or fingers 13 may be connected together in any suitable manner, such as by a conductor 53 passing peripherally around the ring 49 within a groove thereof, and the contacts or fingers 15 may be similarly connected by a conductor 54 also passing peripherally around the ring 49 in a groove thereof below the conductor 53. The contacts 13 and 15 may have downwardly extending outer ends by which connection with the conductors 53 and 54 is effected.

A suitable electric starter 55 (Fig. 1) is connected by a conductor 56 to a suitable controlling switch 57, the other side of the switch 57 being connected by a conductor 58 to the ungrounded terminal of the battery. An electromagnet 59 is connected at one end by a conductor 60 to the conductor 56 and at its other end is grounded through a conductor 61. The electromagnet 59 through armature 62, when energized completes a circuit between conductors 63 and 64, connected respectively to the conductors 12 and 16. A spring 62ᵃ may be provided for normally urging the armature 62 to open circuit position when the electromagnet 59 is deenergized. It will, therefore, be observed that when the starter switch 57 is closed for rendering the starter 55 active in turning over the engine, the electromagnet 59 will be concomitantly energized and serve to close the circuit between the conductors 63 and 64 and electrically bridge the contacts 13 and 15 of the float device. Through the brief period in which the starter is active, the conductors 12 and 16 which form a part of the primary circuit of the ignition coil will be electrically bridged through conductors 63 and 64, and the fact that the float is in its lowermost position will be immaterial.

An electrode 65 is secured upon the inner face of the transparent shell 26 (see Figure 5) in any suitable manner, such as by screws 66, one end of the electrode 65 being in spaced relation with the inner wall of the shell 26. A metallic bushing 67 is also mounted in the shell 26 to extend therethrough and an electrode 68 is threaded through the bushing 67 axially so as to be movable toward and from the free end of the electrode 65 within the shell. The electrode 68 may be secured in adjusted position in any suitable manner, such as by lock nuts 69. A conductor 70 may be secured between nuts 71 threaded upon the bushing 67, and is connected through a manually operable switch 72 to the high tension conductor 4. The electrode 65 is grounded in any suitable manner, such as through a conductor 73. The electrodes 65 and 68 are so placed in the shell 26 as to be below the level of the lubricant which circulates through the same. The electrode 68 may be adjusted toward and from the electrode 65 until any suitable gap between them within the chamber 14 is obtained.

A pure lubricating oil is a non-conductor and consequently when new will serve to prevent an electric discharge across the gap which would ground the high tension side of the ignition system. The lubricant, however, in circulating will take up many impurities, such as minute particles of carbon and metal from the worn parts, all of which are conductors of electricity, and when the proportion of such impurities becomes sufficiently great, the particles or impurities in the portion of the oil in the gap will so lessen the resistance of the gap that it will break down and ground the high tension side of the ignition.

This grounding of the ignition will prevent the operation of the spark plugs 1 and consequently the operator of the vehicle will know that the circulating lubricant should be renewed. It may happen that this disabling of the ignition system may occur at a time and place when it is not convenient or possible to renew the circulating lubricant, and therefore, the operator may open the switch 72 and thus stop the action of the gap between the electrodes in the float chamber. The engine may then be operated again, and the vehicle operated until such time as a renewal of the circulating lubricant can be made.

It is customary in motor driven vehicles to provide regulation lights 73, one side of each of which is grounded and the other sides connected together and to a conductor 74 running to a contact post 75 of a switch 76. It is also customary to provide full lights or touring lights 77, each of which is grounded at one side, and connected together at the other sides and to a conductor 78 which leads to contact posts 79 and 80 of the switch 76. The switch 76 may be provided with contact blades 81 and 82 which are connected for concomitant operation in any suitable manner. A conductor 83 connects the switch blade 81 with the conductor 16 running to the ungrounded terminal of the battery, and the switch blade 82 is connected by a conductor 84 to the conductor 19 leaving the generator 20.

The switch blade 81 is adapted, during the movement of the switch, to make contact with either of the contact posts 80 or 75 and the switch blade 82 is adapted to make contact with the contact post 79 when the switch blade 81 is in contact with the contact post 75. When the switch blade 81 is in engagement with the contact post 75 a circuit will be closed through conductors 16 and 83 to the conductor 74 running to the regulation lights, and at the same time a circuit will be completed from the generator through conductors 19 and 84 to the conductor 78 running to the touring or full lights.

When the engine is running, the generator will supply current directly to the full or touring lights 77 which require considerable current to operate, and the battery will supply current to the regulation lights 73. If the engine is stopped the current from the generator will, of course, cease, and since the electrical connection between the contacts 13 and 15 will be opened by the engine stoppage, the battery cannot supply current to the full or touring lights. It will, therefore, be obvious that if one should stall the engine, or forget or neglect to turn off the full or touring lights, these lights will go out, but the regulation lights will continue to burn.

If the switch 76 is operated to bring the switch blade 81 into engagement with the contact post 80, the conductor 83 connected directly with the battery will be connected to the circuit of the full or touring lights for supplying current thereto. The usual operation of the full or touring lights is preferably directly from the generator, because of the large amount of current which they utilize, but with this switch arrangement it would be possible to operate them from the battery for any reason that is desired.

The crank case of the engine (see Figure 2) is provided with the usual valve-controlled drain pipe 85 by means of which all of the oil may be removed from the crank case, and also with an indicating outlet 86, controlled by valve 87, at a higher level than the drain outlet. The outlet 86 is preferably and commonly provided at such a level, relatively to the crank case, that when the crank case has the maximum desired or necessary quantity of lubricant it will be at the level of the outlet. It is customary to fill the crank case with lubricant until it runs out of the outlet 86 thereby indicating that the engine has a sufficient quantity. The float chamber 14 is preferably arranged at such a level that when the engine is at rest, the level of oil in the float chamber will be well above the high tension terminals and settled sufficiently to allow a descent of the float until it has broken the circuit it controls. Therefore, when the engine is idle, the lubricant will settle into the crank case allowing the float 38 to descend and open the primary ignition circuit.

Figure 6:
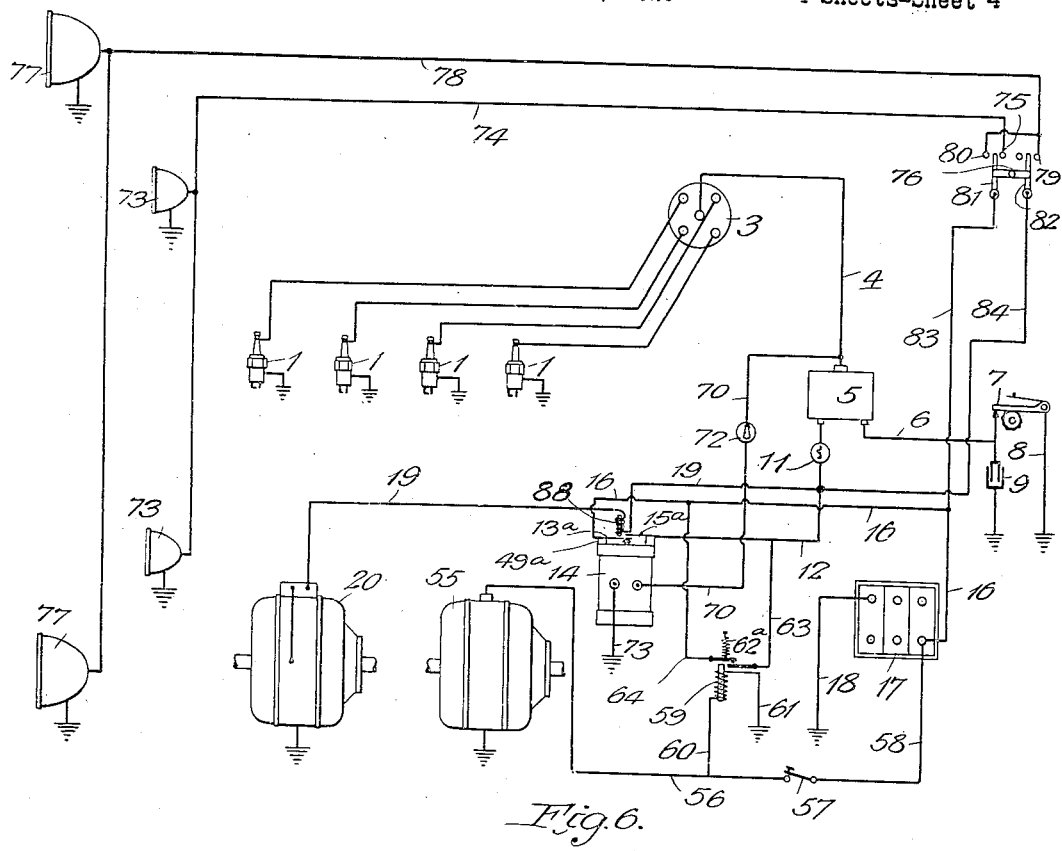
Fig. 6 is a schematic diagram of a modified embodiment of the invention.
Figure 7:
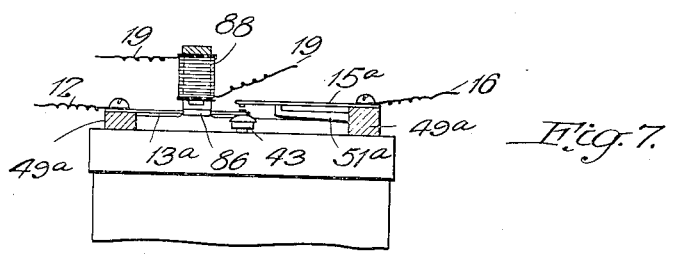
Fig. 7 is a sectional elevation of a portion of the same.

Referring to Figures 6 and 7, the embodiment therein illustrated is identical with that illustrated in Figures 1 to 5 except as to the control of the ignition circuit at the float device. In Figures 6 and 7, the parts that correspond to the parts in Figure 1, will be indicated by corresponding reference numerals and the modified construction by additional numerals. In the modification of Figures 6 and 7, the insulating button 43 which is operated vertically by the float, is normally pressed downwardly by a spring contact arm 13$^a$ carried by an insulating ring 49$^a$. The contact arm 13$^a$ extends beneath the free end of a spring contact arm 15$^a$, also carried by a ring 49$^a$ and limited in its downward movement by the abutment 51$^a$. When the button 43 is operated upwardly by the float, the spring contact arm 13ª will be moved upwardly into electrical engagement with the contact arm 15ª so as to complete the circuit between the conductors 12 and 16.

An electromagnet 88 is disposed above the spring contact arm 13ª, and when energized will attract an armature section 86 carried by the spring contact arm 13ª, so as to move the latter upwardly into electrical engagement with the spring contact arm 15ª. The electromagnet is connected in series in the conductor 19 running from the generator to the conductor 12. With this arrangement, whenever the engine and generator are running at a speed sufficient to charge the battery, the electromagnet 85 will be energized and serve to hold the contact arms 13ª and 15ª in electrical engagement. Therefore, any vertical movements of the float which might be caused by vibrations of the vehicle when traveling rapidly over an uneven roadway, will not cause variations in the ignition circuit, since the circuit will be maintained closed by the electromagnet 88.

In the operation of a motor vehicle having a construction embodying the principle of this invention, assuming that the engine is idle, the float will be in its lowermost position and the circuit between contacts or fingers 13 and 15 (Figure 1) will be open, with the result that the circuit from the battery to the primary of the coil 5 will be open, and there will be no possibility of depletion of the battery through a continuing discharge through the coil in case the make and break mechanism 7 should be closed and the operator had forgotten or neglected to open the switch 11.

The switch 76 may be operated to carry the switch blade 81 into engagement with the contact post 75 and connect the battery directly to the regulation lights, or into engagement with the contact 80 for connecting the battery directly to the full or touring lights. When the operator starts the engine, the switch 57 will be closed, and through it the battery will be connected to the starter 55, and the latter in operating will crank the engine. Concomitantly with the operation of the starter, the circuit of the electromagnet 59 will be completed by the switch 57 and this electromagnet will attract its armature 62 and close a circuit between the conductors 63 and 64, which create an electrical bridge across the float controlled contacts or fingers 13 and 15. The circuit from the battery to the primary of the ignition coil will thus be completed even though the circuit is open at the float controlled contacts.

As soon as the engine is turned over by the starter, the pump 22 will be operated and circulation of the lubricant started, thus raising the level of the lubricant in the float chamber and elevating the float to complete the circuit between the contacts 13 and 15. Thereafter when the engine starts of its own accord and the starter switch 57 is opened, the primary circuit will be closed at the contacts 13 and 15. When the starter circuit is open, the armature 62 will recede to open position and remain in open position until the electromagnet 59 is again energized.

If the switch 76 is in a position to connect the full or touring lights to the generator and the engine stops or is stopped, the full or touring lights will go out, but the regulation lights will remain burning by reason of their connection directly to the battery. When the engine stops, the level of the lubricant in the float chamber will descend, and the float will descend under the joint influence of gravity and the downward pressure of the spring contact 13, thereby opening the primary of the ignition circuit so that if the operator should leave the vehicle without having opened the ignition circuit by an operation of the key controlled switch 11, there can be no depletion of the battery by a discharge through the coil 5.

At the same time, the open circuit between the contacts 13 and 15 serves to interrupt the connection between the battery and generator so that the potential of the battery will be moved from the windings of the generator, and consequently there can be no electrolytic action between the windings of the generator and its grounded casing if moisture should be present in the generator. The open circuit at contacts 13 and 15 also prevents the operation of the touring lights directly from the battery unless the switch 76 is operated to directly connect the battery to the contact 80 of the circuit of the touring lights.

The electrodes 65 and 68 are normally immersed in the circulating lubricant, and since a pure lubricant is an insulator, there will be no discharge of the high tension current across the gap between these electrodes as long as the lubricant remains substantially pure. The lubricant however in circulating will take up minute particles of carbon, metal, and possibly other substances which are conductors of electricity, and when the impurities so taken up reach a certain proportion, the resistance of the gap between the electrodes 65 and 68 will be lessened to such an extent that the high tension current will discharge across the gap to ground, thereby disabling the high tension ignition system, the current going directly to the ground through these electrodes rather than through the distributor and spark plugs. This interruption to the operation of the engine will therefore serve as an indication to the operator of the vehicle that the lubricant has become so impure that further operation may result in injury to the engine, and that the lubricant should be renewed.

In case it is not convenient at the time to renew the lubricant, the switch 72 may be opened which will disconnect the electrodes from the high tension system, and then the vehicle may be operated as before until such time as the renewal of the lubricant can be made, whereupon after the renewal of the lubricant the switch 72 will be again closed. The electrode 68 may be adjusted toward and from the electrode 65 so as to vary the gap between them and thus set the device to indicate that a renewal of the lubricant is necessary when the impurities therein have reached a predetermined or certain proportion.

In case one desires to ascertain the condition of the circulating lubricant at any time, it is merely necessary to hold a source of light at one side of the transparent shell 26, and view the lubricant therein from the opposite side of the shell. A pure lubricant has a distinctive rich yellow or golden color, and after use gradually becomes blacker or darker by reason of the minute particles of foreign matter that are taken up and carried in suspension therein. By this test, removal of any of the lubricant is unnecessary.

In Figures 6 and 7, the operation is similar to that explained in connection with the Figures 1 to 5, except that when the generator is being operated at a rate such that the voltage will charge the battery, the charging current will pass through the electromagnet 88 and magnetically hold the spring contact arm 13ª in electrical contact with the spring contact arm 15ª, thus preventing any possibility of an opening of the ignition circuit by reason of vertical movements of the float from shocks or jars of the vehicle as it moves over an uneven roadway.

It will be understood that various changes in the details and arrangements of parts, which have been herein described and illustrated for the purpose of explaining the nature of the invention, may be made by those skilled in the art within the principle and scope of the invention as expressed in the appended claims.

I claim:

1. In an engine driven vehicle, a pressure oiling system for the engine, ignition means for the engine, a battery, a generator for charging the battery and driven by the engine, means responsive to pressure in the oiling system for connecting the battery to the generator and to the ignition means when the engine is operating and for interrupting the connection to the battery when the engine is idle, and electromagnetic means controlled by the voltage in the generator for preventing the interruption of the connection between the battery and the generator and ignition means while the engine is driving the generator sufficiently rapidly to maintain the voltage of the generated current above any selected value.

2. In an engine driven vehicle, a pressure oiling system for the engine, ignition means for the engine, a battery, a generator for charging the battery and driven by the engine, means including a float operated by the rise in level of the oil in the oiling system during operation of the engine for connecting the battery to the ignition means when the engine is operating and for disconnecting the battery therefrom when the engine is idle, and electromagnetic means controlled by the voltage in the generator for preventing the interruption of the connection between the battery and the ignition means while the engine is driving the generator sufficiently rapidly to maintain the voltage of the generated current above a selected value.

3. In an engine driven vehicle, a pressure oiling system for the engine, ignition means for the engine, a battery, a generator for charging the battery and driven by the engine, means including a float operated by the rise in level of the oil in the oiling system during operation of the engine for connecting the battery to the ignition means and to the generator when the engine is operating and for disconnecting the battery therefrom when the engine is idle, and electromagnetic means controlled by the votage in the generator for preventing the interruption of the connection between the battery and the ignition means and generator while the engine is driving the generator sufficiently rapidly to maintain the voltage of the generated current above a selected value.

4. In an engine driven vehicle, a pressure oiling system for the engine, ignition means for the engine, a battery, a generator for charging the battery and driven by the engine, a float operated by the rise in level of the oil in the oiling system during operation of the engine, contacts arranged to be brought together by the elevation of the float, connections, including said contacts, between the said battery and said ignition means, for completing the connection of the battery to said ignition means through said contacts when the float is elevated, and electromagnetic means controlled by the voltage in the generator for holding the contacts closed while the engine is driving the generator sufficiently rapidily to maintain the voltage of the generated current above a selected value, whereby when the engine is operating above a selected speed the electromagnetic means will prevent separation of the contacts by bobbing of the float.

5. In an engine driven vehicle, a pressure oiling system for the engine, ignition means for the engine, a battery, a generator for charging the battery and driven by the engine, a float operated by the rise in level of the oil in the oiling system during operation of the engine, contacts arranged to be brought together by the elevation of the float, connections, including said contacts, between the said battery and said ignition means, for completing the connection of the battery to said ignition means and said generator through said contacts when the float is elevated, and electromagnetic means controlled by the voltage in the generator for holding the contacts closed while the engine is driving the generator sufficiently rapidly to maintain the voltage of the generated current above a selected value, whereby when the engine is operating above a selected speed the elecromagnetic means will prevent separation of the contacts by bobbing of the float.

6. In an engine driven vehicle, a pressure oiling system for the engine, ignition means for the engine, a battery, a generator for charging the battery and driven by the engine, a float operated by the rise in level of the oil in the oiling system during operation of the engine, contacts arranged to be brought together by the elevation of the float, connections, including said contacts, between the said battery and said ignition means, for completing the connection of the battery to said ignition means through said contacts when the float is elevated, electromagnetic means controlled by the voltage in the generator for holding the contacts closed while the engine is driving the generator sufficiently rapidly to maintain the voltage of the generated current above a selected value, whereby when the engine is operating above a selected speed the electromagnetic means will prevent separation of the contacts by bobbing of the float, an electric starting device for said engine, and means automatically rendered active concomitantly with, and coextensive in duration with, the operation of the starting device for electrically bridging said contacts.

7. In an engine driven vehicle, a pressure oiling system for the engine, ignition means for the engine, a battery, a generator for charging the battery and driven by the engine, a float operated by the rise in level of the oil in the oiling system during operation of the engine, contacts arranged to be brought together by the elevation of the float, connections, including said contacts, between the said battery and said ignition means, for completing the connection of the battery to said ignition means through said contacts when the float is elevated, electromagnetic means controlled by the voltage in the generator for holding the contacts closed while the engine is driving the generator sufficiently rapidly to maintain the voltage of the generated current above a selected value, whereby when the engine is operating above a selected speed the electromagnetic means will prevent separation of the contacts by bobbing of the float, an electric starting device for said engine operated from said battery, a switch for controlling the circuit of said starting device, a branch circuit also controlled by said switch, an electromagnetically operated switch in said branch circuit for bridging electrically, the float operated contacts during operation of the starting device.

8. In an engine driven vehicle, a pressure lubricating system for the engine, including a circulating pump driven by the engine and a conduit leading from the pump to the engine parts to be lubricated, a casing interposed in said conduit so that the circulating lubricant will pass therethrough, a float in said casing movable vertically by the rise of level of the circulating lubricant when the engine is operating, a battery, a high tension ignition device for the engine supplied with energy by said battery, a switch operated to closed position by the float when lifted by the circulating lubricant for closing the circuit from said battery to the ignition device, a pair of electrodes mounted in said casing with a joint gap between them within the casing, one of the electrodes being grounded and the other connected to one of the high tension conductors of said ignition device.

In witness whereof, I hereunto subscribe my signature.

RICHARD VARLEY.